March 6, 1951 — W. G. WEATHERLY — 2,544,117
ENDGATE FOR VEHICLE MOUNTED GRAIN TANK
Filed Sept. 10, 1947 — 4 Sheets-Sheet 1
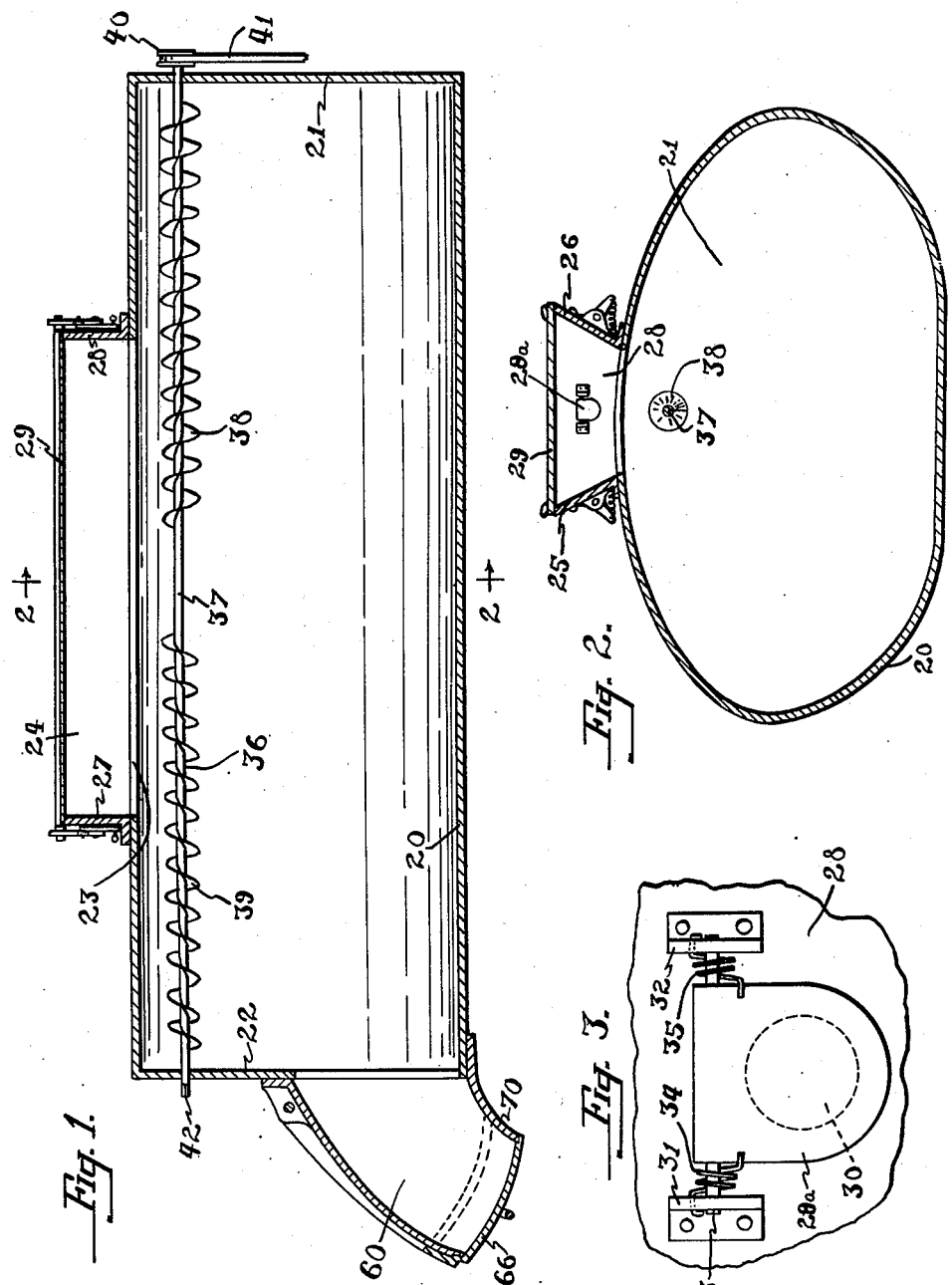

March 6, 1951     W. G. WEATHERLY     2,544,117
ENDGATE FOR VEHICLE MOUNTED GRAIN TANK
Filed Sept. 10, 1947     4 Sheets—Sheet 2

Inventor
William G. Weatherly
By
Smith & Wells
Attorneys

March 6, 1951 W. G. WEATHERLY 2,544,117
ENDGATE FOR VEHICLE MOUNTED GRAIN TANK
Filed Sept. 10, 1947 4 Sheets-Sheet 3
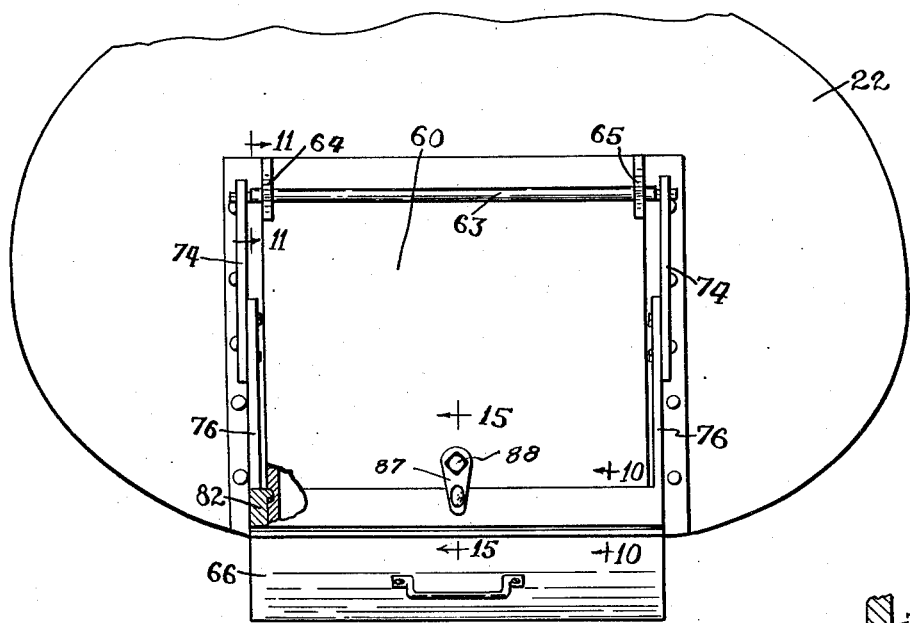
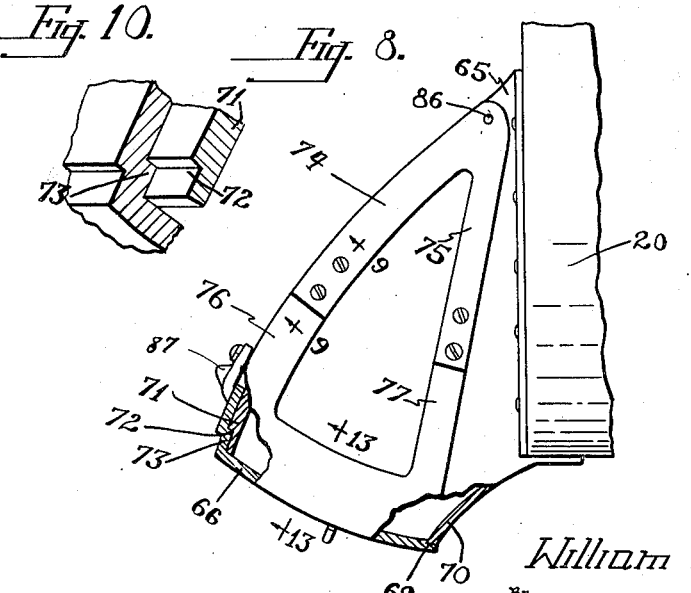
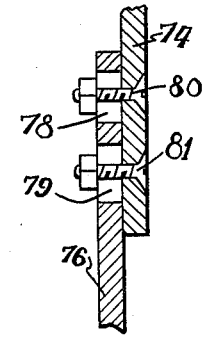
Inventor
William G. Weatherly
By Smith & Wells
Attorneys March 6, 1951 W. G. WEATHERLY 2,544,117
ENDGATE FOR VEHICLE MOUNTED GRAIN TANK
Filed Sept. 10, 1947 4 Sheets-Sheet 4
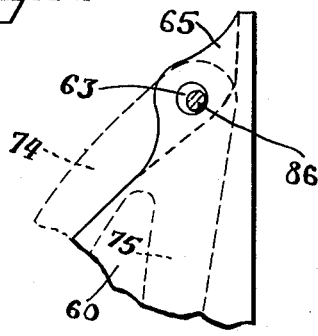
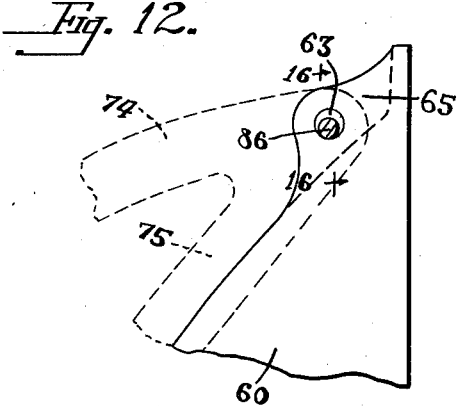
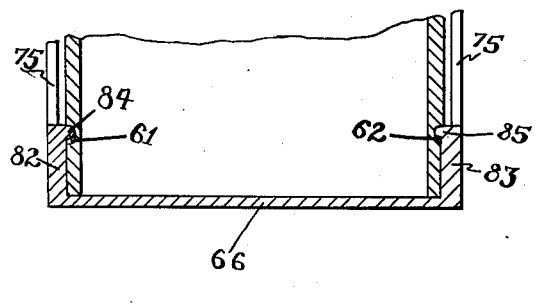
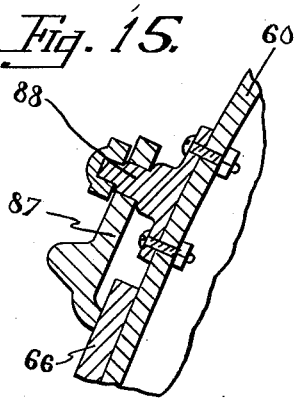
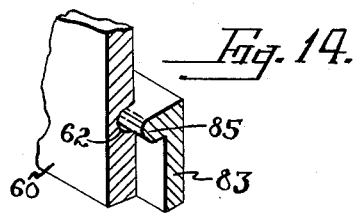
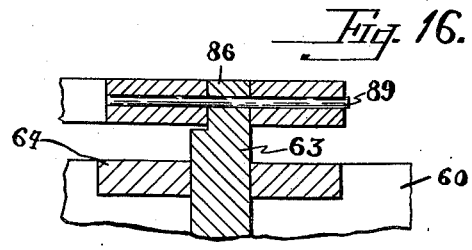
Inventor
William G. Weatherly
By Smith & Wells
Attorneys Patented Mar. 6, 1951

2,544,117

UNITED STATES PATENT OFFICE 2,544,117

ENDGATE FOR VEHICLE MOUNTED GRAIN TANKS

William G. Weatherly, Clarkston, Wash.

Application September 10, 1947, Serial No. 773,138

2 Claims. (Cl. 298—30)

My invention relates to improvements in an end gate for vehicle mounted grain tank.

In the matter of hauling grain crops from the field to storage or shipping points with the present trucks and trailers there is an appalling waste of the grain due to the fact that substantial amounts of the grain either sifts through faulty end gates and cracks in the vehicle body or is lost over the top of the body. In many cases a well-made body will not lose any grain through cracks therein or through the end gate, but with an open top and a full load a single trip to the shipping point may result in the loss of two or three bushels of grain or more. The grain loss is a direct loss in its entirety because of the fact that substantially all of the expenses in connection with producing and harvesting the grain have been incurred when it is loaded into the delivery body. Covered bodies for transporting grain are, of course, not new. Box cars have been used for this purpose for many years. However, to the best of my knowledge there is at present no vehicle body constructed for carrying grain with provision for loading and unloading the body with the ease necessary to make it successful in the field.

It is the purpose of my invention to provide a novel vehicle body or tank for hauling grain, having filling and emptying facilities which make it easy to load and unload the tank but which prevents loss of the grain during transportation thereof.

More specifically it is a purpose of my invention to provide a novel grain transporting tank having an outlet spout with a sealing gate operable to seal the spout and keep it locked and sealed while the grain is being transported.

It is a further purpose of my invention to provide a grain tank of the character described with a novel filling opening and a cover hinged to open toward either side whereby to permit filling from either side of the tank without any change whatsoever in the arrangement of the cover and its mounting.

A further purpose of my invention is to provide, in a grain tank of the character described, a novel means whereby to uniformly distribute the grain in the tank as it is loaded.

The nature and advantages of my invention will appear more fully from the following description and the accompanying drawings wherein a preferred form of the invention is shown. It should be understood, however, that the drawings and description are illustrative only and are not intended to limit the invention except insofar as it is limited by the claims.

In the drawings:

Figure 1 is a longitudinal sectional view through a vehicle body or tank for hauling grain constructed in accordance with my invention;

Figure 2 is a sectional view taken on the line 2—2 of Figure 1;

Figure 3 is an enlarged fragmentary view of the air relief valve shown in Figure 2;

Figure 7 is a rear end view of the tank with the loading inlet mechanism broken away;

Figure 8 is a view in side elevation of the discharge spout and sealing gate at the rear end of the tank, certain parts being broken away to illustrate the construction more fully;

Figure 9 is an enlarged fragmentary sectional view taken on the line 9—9 of Figure 8;

Figure 10 is a fragmentary perspective view on an enlarged scale taken on the line 10—10 of Figure 7;

Figure 11 is an enlarged fragmentary sectional view taken on the line 11—11 of Figure 7;

Figure 12 is a view like Figure 11 showing the parts in changed position;

Figure 13 is a sectional view taken on the line 13—13 of Figure 8;

Figure 14 is a fragmentary perspective view taken on the same line as Figure 13 but illustrating only one of the interlocking and sealing joints between the gate and the spout;

Figure 15 is an enlarged fragmentary sectional view taken on the line 15—15 of Figure 7; and Figure 16 is a fragmentary sectional view taken on the line 16—16 of Figure 12.

Figure 4:
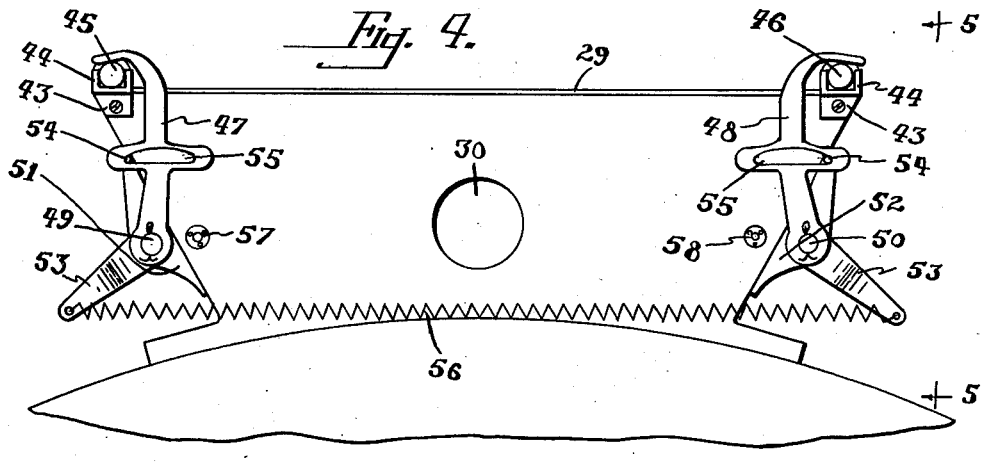
Figure 4 is an enlarged end view looking at Figure 1 from the right-hand end.

Referring now to the drawings, and particularly to Figures 1 and 2 thereof, my invention as shown is embodied in a vehicle body or tank which is adapted to be mounted on the usual truck or trailer frame. No attempt is made herein to show the truck or trailer frame. However, it will be evident from the disclosure of the body that it is particularly suited for those conditions where a dump body is used so that the front end of the body can be elevated to cause the grain to flow out at the rear end of the body. The main body of the tank comprises an oval-shaped sheet metal container 20 with a front end wall 21 and a rear end wall 22. In the top of the tank there is an elongated narrow opening 23 to which a loading chute 24 is applied. The loading chute comprises outwardly and upwardly sloping side walls 25 and 26, upright end walls 27 and 28 and a hinged cover 29. The end wall 28 has an air relief valve 28a mounted over an opening 30 therein, the valve being normally held closed. Two small brackets 31 and 32 are riveted to the end wall 28 to mount a hinge pin 33. Springs 34 and 35 are arranged to hold the valve 28a in closed position.

Within the tank 20 and spaced slightly below the inlet opening 23 I provide a means 36 for distributing the grain endwise in the tank from the opening 23. This distributing mechanism comprises a shaft 37 journalled in the ends 21 and 22 of the tank. Screw blades 38 and 39 are provided on the shaft and these blades are arranged to feed the grain away from the central portion of the shaft toward the ends of the tank when the shaft is rotated. The blades 38 are wound in the opposite direction to the blades 39 as will be evident from the drawings. At the front end of the tank the shaft 37 projects through the tank and is provided with a pulley 40 for connecting by means of a belt 41 to a driving mechanism, not shown, which may be provided by the truck on which the tank is mounted. I also arrange the shaft 37 so that it can be rotated by hand by providing a square end 42 thereon at the rear end of the tank outside of the rear wall 22. This squared end is adapted to receive a hand crank so that the shaft 37 may be rotated by hand.

Figure 5:
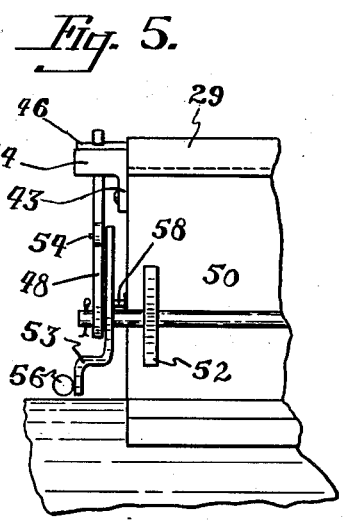
Figure 5 is a fragmentary view in side elevation looking at Figure 4 in the direction indicated by the numerals 5—5.
Figure 6:
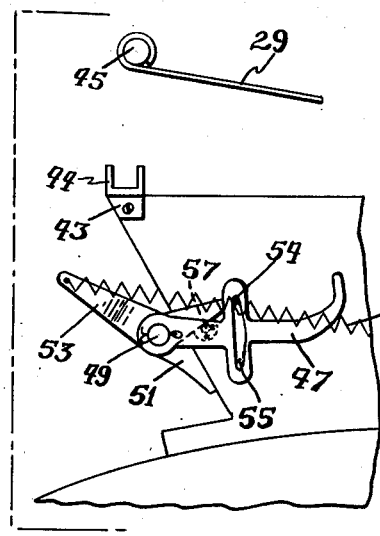
Figure 6 is a fragmentary view of the left-hand portion of Figure 4 but showing the parts in a changed position.

Referring now particularly to Figures 4 to 6 inclusive, in these figures the mechanism for hinging the cover 29 of the inlet chute is illustrated. At each upper corner of the chute I mount brackets 43 which have upwardly opening channel bars 44 integral therewith. The cover 29 has pintles 45 and 46 projecting endwise therefrom of its opposite side edges. A simple way of providing the pintles 45 and 46 is to roll the opposite side edges of the cover 29 around small rods so that the rods extend outwardly at both ends of the cover. These pintles 45 and 46 normally are seated in the channel bars 44 so that the cover rests on the walls of the chute. The pintles are held in the channel bars by clamping levers 47 and 48, there being four of these levers. The levers are pivoted on stub shafts 49 and 50 which are mounted on brackets 51 and 52 at the opposite corners of the chute. Each shaft has a bell crank lever 53 thereon. One end of the bell crank lever has a pin 54 engaging a curved slot 55 provided in the levers such as 47 and 48. The lower ends of the bell crank levers at the opposite sides of the chute are connected together by springs 56 which are under tension so as to tend to hold both of the levers 47 and 48 at each end of the chute in their clamping position as illustrated in Figure 4. The arrangement is such that by lifting the levers 53 at one side of the chute they can be moved until the spring connected therewith passes above the shaft 49 or 50, in which position the clamping lever will be held out of the way in the position shown in Figure 6 to release that side of the cover in order that it may be swung up out of the way of the chute and allow the chute to be used for filling the tank. The clamping levers at the opposite side will, of course, be held in clamping position so that the cover can swing around its pintles. Small stop pins illustrated at 57 and 58 in Figure 4 are provided for the bell crank levers so as to limit their swinging movement. With this construction the cover 29 can be swung upward about either side edge as a pivot. The cover can also be removed entirely by releasing the levers 47 and 48 at the same time. When the levers are all in clamping position, the cover is, of course, held down to seal the top of the chute and protect the grain within the tank.

It is believed to be evident from the foregoing description that the tank can be readily filled with grain and closed so as to fully protect the grain against dust, dirt or water while it is being transported. The elongated inlet opening and the chute provide adequate space for aligning the inlet with any filling device used.

In order to empty the contents of the tank the rear end of the tank is provided with a large, rearwardly and downwardly extending, discharge spout 60. This spout is substantially rectangular in cross section. The side walls of the spout (see Figure 13) have grooves 61 and 62 therein, the grooves being curved about an axis which is located at the center of a shaft 63 that is pivotally mounted in brackets 64 and 65 near the top of the spout. The lower end of the spout is also cut off along a curved line which is centered about the same axis. In order to seal the spout, while the tank is being filled and the grain is being transported therein, I provide a gate 66 for closing the lower end of the spout. This gate has its lower forward edge recessed as illustrated at 69 in Figure 8 so as to lap over the lower front wall 70 of the spout and make a grain-tight seal at this point. The lower rear wall 71 of the spout has a shoulder at 72 and a corresponding shoulder 73 is provided on the gate 66 so as to form a grain-tight seal at this point.

The gate 66 is suspended from the shaft 63 by arms 74 and 75 at both side edges of the spout. These arms have an adjustable connection with upwardly extending arms 76 and 77 which are rigid with the gate 66. The adjustment is provided as shown by Figure 9 by providing slots 78 and 79 in the arms 76 and 77 and bolts 80 and 81 in the arms 74 and 75.

The gate 66 in addition to closing the bottom of the tank has side portions 82 and 83 which have curved ribs 84 and 85 thereon. These ribs 84 and 85 set in the grooves 61 and 62 but are slightly smaller in depth so as to have a small amount of play therein. This play is provided in order that there will be no excess friction which will prevent the gate from sliding into closed position. It is essential, however, that when the gate reaches closed position, it will be drawn up tightly against the bottom edge of the spout and the ribs 84 and 85 will be drawn up against the upper edges of the grooves 61 and 62. This is accomplished by providing an eccentric mounting for the gate on the shaft 63. Figures 11, 12 and 16 illustrate this construction. At each end of the shaft there is provided a reduced end portion 86 which is eccentric with respect to the shaft and so positioned that as the gate moves toward closed position it will be slightly lifted. Figure 12 illustrates the gate in dotted lines in open position with the offset reduced portion 86 of the shaft directly downward with respect to the axis of the shaft 63. The arms 74 and 75 are joined at the top and are hinged to the reduced portion 86 by a pin 89. In Figure 11 the gate, again shown in dotted lines, has been moved to closed position thus moving the eccentric portion 86 of the shaft inwardly and upwardly from the position shown in Figure 12. This movement is translated to the lower portions of the gate so as to wedge the gate tightly against the bottom of the spout and lock it in place. In order to prevent any possible shifting of the gate once it is closed I provide a latch member 87 on the back of the spout. This latch member is pivoted on a post 88 that is fastened to the spout so that it can be raised out of the way when the gate is to be opened.

The gate 66 is opened from the closed position shown in Figure 8 by releasing the latch 87 and pulling rearwardly on the handle provided on the gate. The offset portion 86 of the shaft 63 moves downwardly and rearwardly from the position shown in Figure 11 to that shown in Figure 12 as the gate swings open. This action prevents binding of the ribs 84—85 in the grooves 61 and 62 of the spout, and allows the gate to move freely. In closing the gate the grooves 61 and 62 guide the gate as it moves toward closed position and the offset portions 86 of the shaft 63 lift the gate as it approaches the closed position so as to bring the parts 69—70 and 72—73 into tight engagement. The adjustment of the arms 74—75 makes it possible to maintain a tight seal of the gate.

A grain tank constructed in accordance with my invention as hereinbefore described, and as shown in the drawings, seals the grain within the tank so that there can be no leakage during the transportation thereof. The construction of the spout is such that when the gate is opened there are no ledges or projections on the inside thereof where dust or grain might remain after the tank is emptied. This is also true of the gate. When the gate is swung up to open position any foreign matter thereon will fall free of the sealing edges so that when the gate is again closed there will be no difficulty due to accumulated grain particles or dirt particles.

It is not an uncommon thing in the hauling of grain in the wheat areas near here for the highways to become completely littered with grain. The grain so lost is, of course, a complete financial loss to the growers thereof since all of the expenses of producing and harvesting the grain have already been incurred. With my invention these losses are avoided. Also with my improved grain tank weather conditions do not prevent hauling the grain since it is fully protected once it is loaded in the tank, against moisture and dirt. Wind cannot blow the grain out of the tank.

Having thus described my invention I claim:

1. In a vehicle body for hauling grain, said body having a discharge opening in the lower portion of one end thereof, a discharge spout rectangular in cross-section projecting from said opening, and a gate hinged on the discharge spout for closing it, said gate and spout having cooperating overlapped side portions provided with slidably interfitting grooves and ribs and said gate having ledges engaging and overlapping the front and rear edges at the outer end of the spout sealing the spout.

2. In a vehicle body for hauling grain, said body having a discharge opening in the lower portion of one end thereof, a discharge spout rectangular in cross-section projecting from said opening, and a gate hinged on the discharge spout for closing it, said gate and spout having cooperating overlapped side portions provided with slidably interfitting grooves and ribs and said gate having ledges engaging and overlapping the front and rear edges at the outer end of the spout sealing the spout, the gate being hinged to the spout by an eccentric pivotal mounting operable to press the ledges and edges tightly together as the gate moves to closed position.

WILLIAM G. WEATHERLY.

REFERENCES CITED

The following references are of record in the file of this patent:

UNITED STATES PATENTS

| Number | Name | Date |
|---|---|---|
| 1,333,464 | Christophersen | Mar. 9, 1920 |
| 1,653,631 | Kirkland | Dec. 27, 1927 |
| 1,795,016 | Faber | Mar. 3, 1931 |
| 1,821,056 | Durham | Sept. 1, 1931 |
| 2,110,262 | Curtis | Mar. 8, 1938 |
| 2,169,463 | Eisenberg, Jr. | Aug. 15, 1939 |
| 2,190,724 | McBride | Feb. 20, 1940 |
| 2,290,460 | Winsor | July 21, 1942 |

FOREIGN PATENTS

| Number | Country | Date |
|---|---|---|
| 105,991 | Germany | 1899 |
| 385,144 | Germany | Nov. 19, 1923 |
| 116,474 | Switzerland | Nov. 11, 1925 |